US006928767B1

(12) United States Patent
Bolt

(10) Patent No.: US 6,928,767 B1
(45) Date of Patent: Aug. 16, 2005

(54) SPREADER AND SPREADER ASSEMBLY

(76) Inventor: David L. Bolt, 1223 Centennial Blvd., Springfield, OR (US) 97477

( * ) Notice: Subject to any disclaimer, the term of this patent is extended or adjusted under 35 U.S.C. 154(b) by 15 days.

(21) Appl. No.: 10/866,366

(22) Filed: Jun. 10, 2004

(51) Int. Cl.[7] .......................................... A01K 91/053
(52) U.S. Cl. ................................................... 43/42.74
(58) Field of Search ........................................ 43/42.74

(56) References Cited

U.S. PATENT DOCUMENTS

| | | | | |
|---|---|---|---|---|
| 175,949 | A | * | 4/1876 | Dixon ......................... 43/42.74 |
| 1,782,010 | A | * | 11/1930 | Meyer ......................... 43/42.74 |
| 2,170,067 | A | * | 8/1939 | Stephen ...................... 43/42.74 |
| 2,201,351 | A | * | 5/1940 | Skoverski .................... 43/42.74 |
| 2,231,616 | A | * | 2/1941 | Costantino .................. 43/42.74 |
| 2,462,290 | A | * | 2/1949 | Sauvey ....................... 43/42.74 |
| 2,531,235 | A | * | 11/1950 | Sicotte ............................ 43/5 |
| 2,551,998 | A | * | 5/1951 | De Groot .................... 43/42.74 |
| 2,759,290 | A | * | 8/1956 | Strausser .................... 43/42.74 |
| 2,814,901 | A | * | 12/1957 | Suiter ......................... 43/42.74 |
| 2,933,847 | A | * | 4/1960 | Frasure ....................... 43/42.74 |
| 3,270,458 | A | * | 9/1966 | McAfee ...................... 43/42.74 |
| 3,943,652 | A | * | 3/1976 | Aunspaugh ................. 43/42.74 |
| 4,920,687 | A | * | 5/1990 | Barnett ....................... 43/42.74 |
| 4,998,374 | A | * | 3/1991 | Barnett ....................... 43/42.74 |
| 5,444,936 | A | * | 8/1995 | McDonald .................. 43/42.74 |
| 5,450,689 | A | * | 9/1995 | Glick .......................... 43/44.97 |
| 5,797,209 | A | * | 8/1998 | Nicholas ..................... 43/42.74 |
| 6,000,166 | A | * | 12/1999 | Kirkpatrick ................. 43/42.74 |
| 6,618,980 | B1 | * | 9/2003 | De Boer, Jr. ............... 43/42.74 |

FOREIGN PATENT DOCUMENTS

| | | | |
|---|---|---|---|
| JP | 3-175922 | B1 * | 7/1991 |
| JP | 6-261659 | B1 * | 9/1994 |
| JP | 10-56929 | B1 * | 3/1998 |
| JP | 10-75969 | B1 * | 3/1998 |
| JP | 2000-316440 | B1 * | 11/2000 |
| JP | 2001-85 | B1 * | 1/2001 |
| JP | 2002-78436 | B1 * | 3/2002 |
| JP | 2004-33196 | B1 * | 2/2004 |

* cited by examiner

*Primary Examiner*—Darren W. Ark
(74) *Attorney, Agent, or Firm*—Robert E. Howard

(57) ABSTRACT

A spreader for use in a spreader assembly in fishing. The spreader has a thin, elongated body having a lower edge, an upper edge, a leading edge and a trailing edge. The upper edge is at an angle to the lower edge with the distance between the lower edge and the upper edge decreasing from the leading edge to the trailing edge. The spreader body has an upper, leading opening located adjacent the intersection of the leading edge and upper edge, and is adapted to receive a line from a fishing pole. A lower, leading opening is located adjacent the intersection of the leading edge and the lower edge, and is adapted to receive a line attached to a sinker. A trailing opening is located adjacent the trailing edge, and is adapted to receive a line attached to a lure.

13 Claims, 2 Drawing Sheets

SPREADER AND SPREADER ASSEMBLY

BACKGROUND OF THE INVENTION

The present invention relates to a spreader for use with a sinker and fishing lure to form a spreader assembly.

Fishermen often use a spreader attached to a fishing pole line to separate a line attached to a sinker weight and a nearby line attached to a fishing lure or bait. Such spreaders are typically triangular in shape with the fishing pole line attached to an opening located at the apex of the triangle and the sinker and lure lines being attached to openings located at the bottom corners of the triangle. See FIG. 1 for such a prior art spreader arrangement.

The problem with such prior art spreaders is that the sinker and lure lines can be easily tangled up.

SUMMARY OF THE INVENTION

It is an object of the present invention to provide a spreader that reduces or eliminates tangling of the sinker and lure lines attached thereto.

The spreader of the present invention has a thin, elongated body having a lower edge, an upper edge, a leading edge and a trailing edge. The upper edge is at an angle to the lower edge with the distance between the lower edge and the upper edge decreasing from the leading edge to the trailing edge. The spreader body has an upper, leading opening located adjacent the intersection of the leading edge and upper edge and is adapted to receive a line from a fishing pole. A lower, leading opening is located adjacent the intersection of the leading edge and lower edge and is adapted to receive a line attached to a sinker. A trailing opening is located adjacent the trailing edge and is adapted to receive a line attached to a lure.

DESCRIPTION OF PREFERRED EMBODIMENTS

Figure 1:
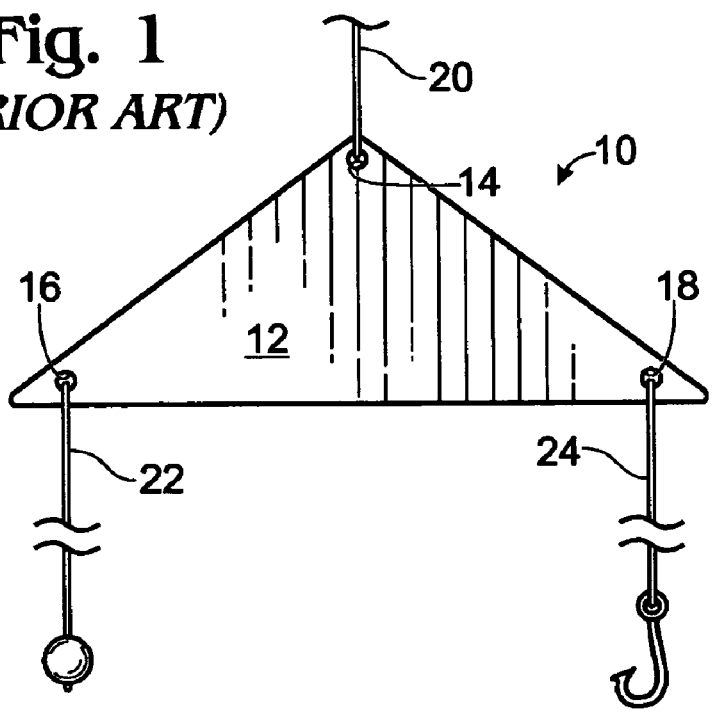
FIG. 1 is a front view of a prior art spreader assembly.

FIG. 1 shows a prior art spreader assembly 10 including a triangular spreader 12 having an upper opening 14 located at the apex thereof and lower openings 16 and 18 located at the bottom corners thereof. A fishing pole line 20 extending from a fishing pole (not shown) is attached to upper opening 14, a sinker line 22 is attached to lower opening 16 and a lure line 24 attached to lower opening 18.

The spreader assembly 30 of the present invention includes a thin, elongated spreader body 40. Spreader body 40 includes a lower edge 42, an upper edge 44, a leading edge 46 and a trailing edge 48. Lower and upper edges 42 and 44 are substantially straight while leading edge 46 and trailing edge 48 are rounded.

Spreader body 40 includes an upper, leading opening 50, a lower, leading opening 52, and a trailing opening 54. Upper, leading opening 50 is located adjacent the intersection of leading edge 46 and upper edge 44. Lower, leading opening 52 is located adjacent the intersection of leading edge 46 and lower edge 42, and is positioned forward of upper, leading opening 50. Trailing opening 54 is located adjacent the trailing edge 48 in a mid-portion thereof.

Figure 3:
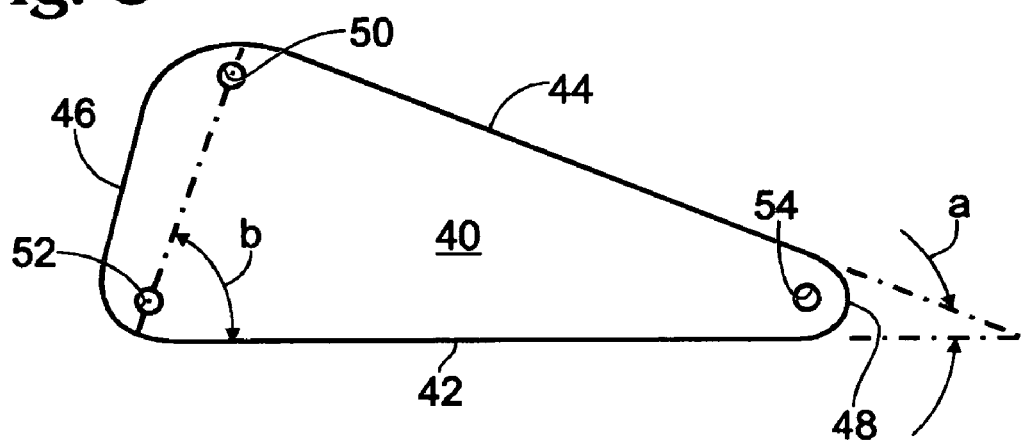
FIG. 3 is an enlarged side view of the spreader of the present invention.
Figure 4:
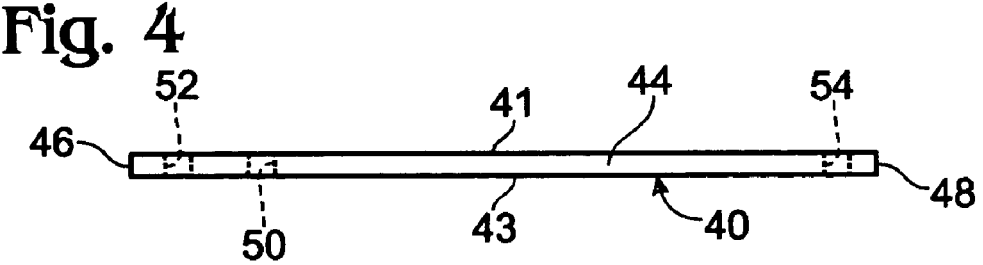
FIG. 4 is a top, plan view of the spreader of the present invention.
Figure 2:
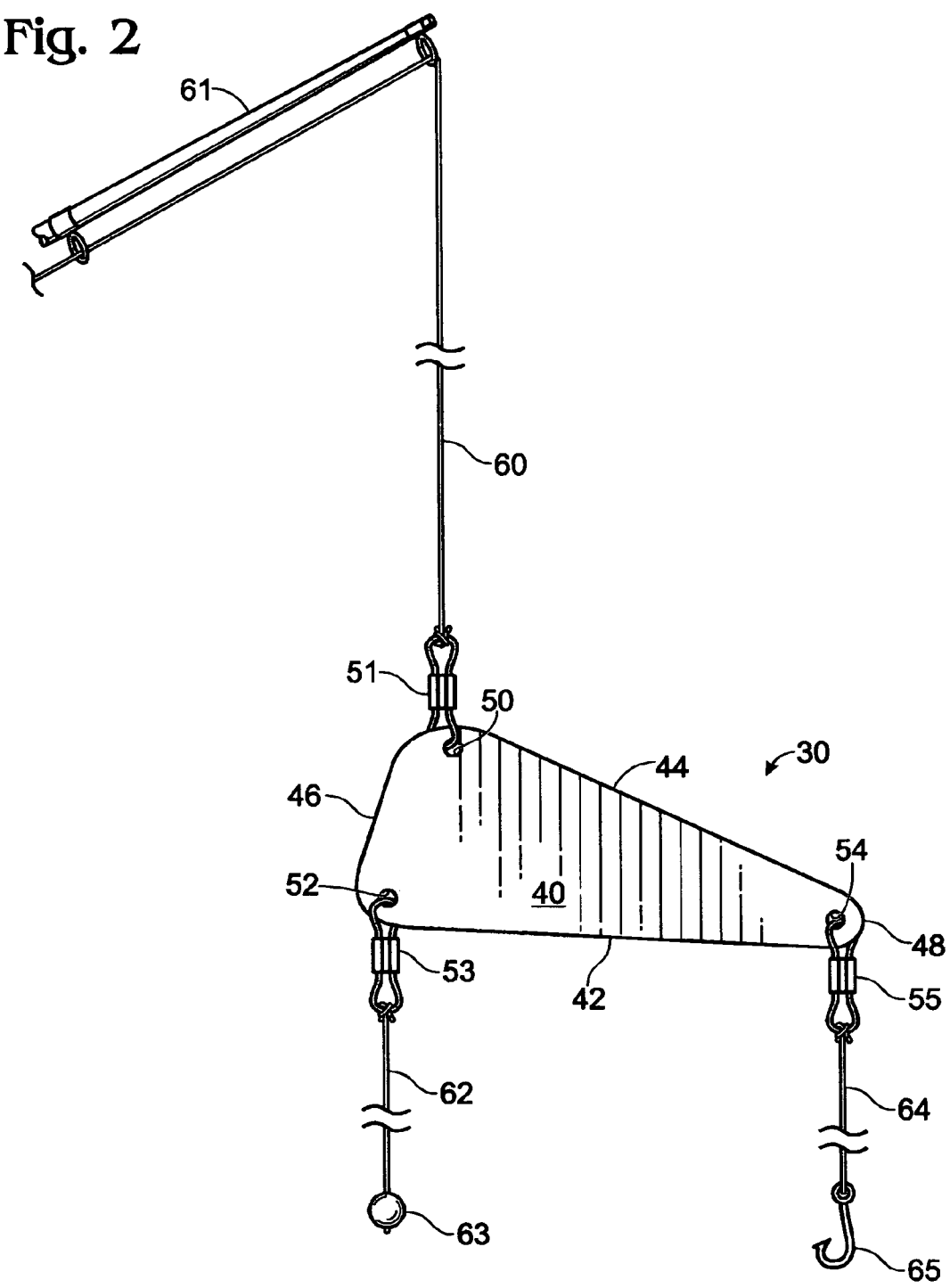
FIG. 2 is a side view of the spreader assembly of the present invention.

The angle "a" between the lower edge 42 and upper edge 44, as extended by the imaginary lines shown in FIG. 3, is preferably between about 10 degrees and about 20 degrees.

The angle "b" between lower edge 42 and a line extended through upper, leading opening 50 and lower, leading opening 52, is between about 25 degrees and about 70 degrees. Preferably, angle "b" is between about 25 degrees and about 50 degrees for lighter sinker weights (under about 8 ounces), and preferably between about 60 degrees and about 70 degrees for heavier sinker weights (over about 8 ounces).

The distance between upper, leading opening 50 and lower, leading opening 52 is much less than the distance between either opening 50 or 52 and trailing opening 54, the ratio of said distances being between about 1:2 and 1:6.

The distance between lower, leading opening 52 and trailing opening 54 should be greater for use with lighter sinker weights (under about 8 ounces) than for heavier sinker weights (over about 8 ounces) so that the distance between sinker line 62 and lure line 64 is greater. Although the spreader 30 is not limited to particular dimensions, a satisfactory length for the distance between openings 52 and 54 for a spreader used with heavier weights is about 3 inches, and for a spreader 30 used with lighter weights a length of about 5 inches is satisfactory.

The planar surfaces 41 and 43 of spreader body 40 are substantially parallel. Spreader body 40 is relatively thin, the distance between the planar surfaces 41 and 43 preferably being less than about 2.0 mm. Although spreader body 40 is somewhat flexible, it is substantially rigid, and preferably made of a transparent plastic. A design, such as one that simulates fish scales, can be applied to one or both planar surfaces 41 and 43 of spreader body 40, such as by use of a printed pressure sensitive adhesive tape applied thereto.

A fishing pole line 60 extending from fishing pole 61 is attached to upper, leading opening 50 via a conventional coupler 51, a sinker line 62 attached to lower, leading opening 52 via a conventional coupler 53, and a lure line 64 attached to trailing opening 54 via a conventional coupler 55. A sinker 63 is attached to the lower end of sinker line 62, and a lure 65 attached to the lower end of lure line 64. Lure 65 is shown as a hook (which in use would be baited with a suitable bait, not shown), but can be any artificial lure as well.

The spreader assembly 30 is used in trolling for fish. Spreader body 40 pivots about coupler 51 as sinker 63 and lure 65 move up and down, and the elongated thin body of spreader 40 acts as a rudder to thereby cause lure line 64 to always trail sinker line 62 and thereby prevent sinker line 62 and lure line 64 from becoming entangled.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A spreader for use in a spreader fishing assembly comprising:

a thin, elongated spreader body having a lower edge, an upper edge, a leading edge and a trailing edge;

said upper edge being at an angle to the lower edge of between about 10 degrees and about 20 degrees, the distance between said lower edge and said upper edge decreasing from the leading edge to the trailing edge;

an upper, leading opening for receiving a line from a fishing pole, said upper, leading opening being located adjacent the intersection of said leading edge and said upper edge;

a lower, leading opening for receiving a line attached to a sinker, said lower, leading opening being located adjacent the intersection of said leading edge and said lower edge, said lower, leading opening being located forward of said upper opening; and a trailing opening for receiving a line attached to a lure, said trailing opening being located adjacent said trailing edge.

2. The spreader of claim 1 wherein said lower and upper edges are substantially straight.

3. The spreader of claim 1 wherein the distance between said upper, leading opening and said lower, leading opening is much less than the distance between either said upper or said lower leading opening and said trailing opening.

4. The spreader of claim 3 in which the ratio of said distance between said upper, leading opening and said lower, leading opening, and the distance between either said upper or said lower leading opening and said trailing opening is between about 1:2 and about 1:6.

5. The spreader of claim 1 wherein the angle between said lower edge and a line extending through said upper and said lower leading openings is between about 25 degrees and about 70 degrees.

6. The spreader of claim 5 wherein said angle is between about 60 degrees and about 70 degrees.

7. A spreader assembly for use in fishing comprising:
a spreader, said spreader comprising
a thin, elongated spreader body having a lower edge, an upper edge, a leading edge and a trailing edge;
said upper edge being at an angle to the lower edge of between about 10 degrees and about 20 degrees, the distance between said lower edge and said upper edge decreasing from the leading edge to the trailing edge;

an upper, leading opening for receiving a line from a fishing pole, said upper, leading opening being located adjacent the intersection of said leading edge and said upper edge;

a lower, leading opening, said lower, leading opening being located adjacent the intersection of said leading edge and said lower edge, said lower, leading opening being located closer to said leading edge than said upper opening; and a trailing opening, said trailing opening being located adjacent said trailing edge;

a sinker attached by a line to said lower, leading opening; and a lure attached by an other line to said trailing opening.

8. The spreader of claim 7 wherein said lower and upper edges are substantially straight.

9. The spreader assembly of claim 7 wherein the distance between said upper, leading opening and said lower, leading opening of said spreader is much less than the distance between either said upper or said lower leading opening and said trailing opening.

10. The spreader assembly of claim 9 in which the ratio of said distance between said upper, leading opening and said lower, leading opening, and the distance between either said upper or said lower leading opening and said trailing opening is between about 1:2 and about 1:6.

11. The spreader assembly of claim 10 wherein said ratio is between about 1:4 and about 1:5.

12. The spreader assembly of claim 7 wherein the angle between said lower edge of said spreader and a line extending through said upper and said lower leading openings of said spreader is between about 25 degrees and about 70 degrees.

13. The spreader assembly of claim 12 wherein said angle is between about 60 degrees and about 70 degrees.

\* \* \* \* \*